US008374390B2

(12) United States Patent
Stroila et al.

(10) Patent No.: US 8,374,390 B2
(45) Date of Patent: Feb. 12, 2013

(54) GENERATING A GRAPHIC MODEL OF A GEOGRAPHIC OBJECT AND SYSTEMS THEREOF

(75) Inventors: Matei Stroila, Chicago, IL (US); Yelena V. Perelmutova, Naperville, IL (US); Bradley Kohlmeyer, Lisle, IL (US)

(73) Assignee: Navteq B.V., Veldhoven (NL)

( * ) Notice: Subject to any disclaimer, the term of this patent is extended or adjusted under 35 U.S.C. 154(b) by 866 days.

(21) Appl. No.: 12/490,676

(22) Filed: Jun. 24, 2009

(65) Prior Publication Data

US 2010/0328316 A1 Dec. 30, 2010

(51) Int. Cl.
*G06K 9/00* (2006.01)
(52) U.S. Cl. ......................................... 382/103; 382/190
(58) Field of Classification Search .................. 382/103, 382/190
See application file for complete search history.

(56) References Cited

U.S. PATENT DOCUMENTS

| | | | |
|---|---|---|---|
| 6,560,529 B1 | 5/2003 | Janssen | |
| 6,711,293 B1 | 3/2004 | Lowe | 382/219 |
| 7,068,844 B1 * | 6/2006 | Javidi et al. | 382/218 |
| 7,466,841 B2 * | 12/2008 | Bahlmann et al. | 382/103 |
| 7,486,175 B2 * | 2/2009 | Suzuki et al. | 340/435 |
| 7,605,773 B2 * | 10/2009 | Janssen | 345/7 |
| 7,917,286 B2 | 3/2011 | Taylor et al. | |
| 7,995,796 B2 * | 8/2011 | Retterath et al. | 382/104 |
| 2007/0140595 A1 | 6/2007 | Taylor et al. | 382/310 |
| 2009/0074249 A1 * | 3/2009 | Moed et al. | 382/104 |

FOREIGN PATENT DOCUMENTS

DE 19842176 A1 3/2000

OTHER PUBLICATIONS

Zuiderveld, Karel, *Graphics Gems*, VIII.5—Contrast Limited Adaptive Histogram Equalization, pp. 474-485, ISBN 0-12-336155-9 (1994).
Coughlan Lab, Applications for Visual Impairments, Applications of Computer Vision for the Blind and Visually Impaired, pp. 1-3, http://www.ski.org/Rehab/Coughlan_lab/General/ApplicationsForVisualImpairments.html (Aug. 2007).
Applied Media Analysis, Inc., Mobile Vision Technologies, pp. 1-2, http://www.appliedmediaanalysis.com/technologies.htm (2007).
Detecting Text from Natural Scenes, pp. 1-2, http://www.cs.cmu.edu/~yang/projects/text_det.html, (2006).
Yang, J., Interactive Systems Laboratories: Road Signs, Detection of Text on Road Signs from Video, pp. 1-2, http://www.isl.ira.uka.de/projects/current_projects/road_signs/ (viewed on Jan. 12, 2010).
The Blindsight Corporation, pp. 1-3, http://www.blindsight.com/about/ (2009).
Manual on Uniform Traffic Control Devices (MUTCD)—FHWA, U.S. Department of Transportation, Federal Highway Administration, pp. 1-2, http://www.mutcd.fhwa.dot.gov/ (2009).

(Continued)

*Primary Examiner* — John Strege

(57) ABSTRACT

Systems, devices, features, and methods for constructing a graphic model of a geographic object, such as a road sign or features thereof, from an image, such as, for example, to develop a navigation database are disclosed. For example, one method comprises receiving a plurality of images of regions, such as of roads or paths. An image of the plurality of images is identified. A process to determine scale-invariant components of a geographic object in the identified image may be performed. Other processes, such as generating a dictionary to facilitate optical character recognition may be performed. A graphic model of the geographic object is generated based on the scale-invariant components and/or the optical character recognition. The generated graphic model may be associated with a navigation or map database.

26 Claims, 6 Drawing Sheets

OTHER PUBLICATIONS

Se, Stephen, *Zebra-crossing Detection for the Partially Sighted*, pp. 1-7, http://stephense.com/research/papers/cvpr00.pdf (2000).

Lowe, David G., *Object Recognition from Local Scale-Invariant Features*, pp. 1-8, http://people.cs.ubc.ca/~lowe/papers/iccv99.pdf (1999).

Lowe, David G., *Distinctive Image Features from Scale-Invariant Keypoints*, pp. 1-28, http://people.cs.ubc.ca/~lowe/papers/ijcv04.pdf (2004).

SignCAD, pp. 1-5, http://www.signcad.com/about/php (viewed on Jan. 12, 2010).

Felzenszwalb, et al., *Efficient Graph-Based Image Segmentation*, pp. 1-26, http://people.cs.uchicago.edu/~pff/papers/seg-ijcv.pdf (2004).

Valluri, Adityagiri, *Navigation and Mapping Through Automated Image Understanding and Retrieval*, The Pennsylvania State University, The Graduate School, Department of Electrical Engineering, A Thesis in Electrical Engineering, title page—p. 97 (May 2009).

Di Stefano, et al., *An Efficient Algorithm for Exhaustive Template Matching based on Normalized Cross Correlation*, Proceedings of the 12$^{th}$ International Conference on Image Analysis and Processing (ICIAP'03), pp. 1-6, (2003).

Sergio Escalera Guerro et al., "Fast Traffic Sign Model Matching and Recognition on Gray Scale Images", Universidad Autonoma de Barcelona, Bellaterra, Jul. 1, 2005 (005-07-01), XP55027508, Retrieved from the Internet: URL:http://www.maia.ub.es/'serfio/files/TESINA.pdf [retrieved on May 16, 2012], abstract; figures 2, 6, 14, 19, 25, 26, 29, p. 11-50.

Hoeferlin B: "Verkehrszeichenerkennung", Diplomarbeit Universitaet Stuttgart, No. 2679, Nov. 19, 2007, pp. 1-167, XP007915250.

European Search Report cited in European Application No. EP10250856 mailed May 24, 2012.

* cited by examiner

GENERATING A GRAPHIC MODEL OF A GEOGRAPHIC OBJECT AND SYSTEMS THEREOF

BACKGROUND OF THE INVENTION

The present invention relates to analyzing and processing image data and, more particularly, to generating graphic models of geographic objects from collected images.

Geographic features or objects, such as road signs or road markings, are prevalent in today's society. For example, when a person drives or walks to work or other destination, he or she usually encounters a traffic or road sign or marking on a road. Cognizance of such geographic features helps in navigating throughout various areas as well as helps in maintaining order and safety for one's self and others.

Graphic models of such geographic features or objects may assist end users in a variety of applications. For example, navigation systems or devices may provide useful displays and visual guidance in instructing or guiding people to desired destinations. Navigation devices use map or geographic data, including navigation-related attributes, to provide features, such as map display and map guidance. Some or all of the geographic data or graphic models may be provided and/or generated from collected information.

However, collection and processing procedures to provide geographic data for use in navigation systems may be a significant undertaking. For example, collection of data about roads or paths in a geographic area and developing useful geographic data and/or models for navigation devices may be time consuming and/or intricate. Accordingly, systems, methods, and/or techniques to assist, aid, and/or expedite developing geographic data and/or graphic models, such as for use in a navigation device or other map or location-based service devices or databases, are useful.

SUMMARY OF THE INVENTION

According to one aspect, a method for constructing a graphic model of a geographic object from an image is disclosed. For example, the method includes receiving a plurality of images of regions about roads or paths. An image of the plurality of images is identified. A process to determine scale-invariant components of a geographic object in the identified image is performed. A graphic model of the geographic object is generated based on the scale-invariant components.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
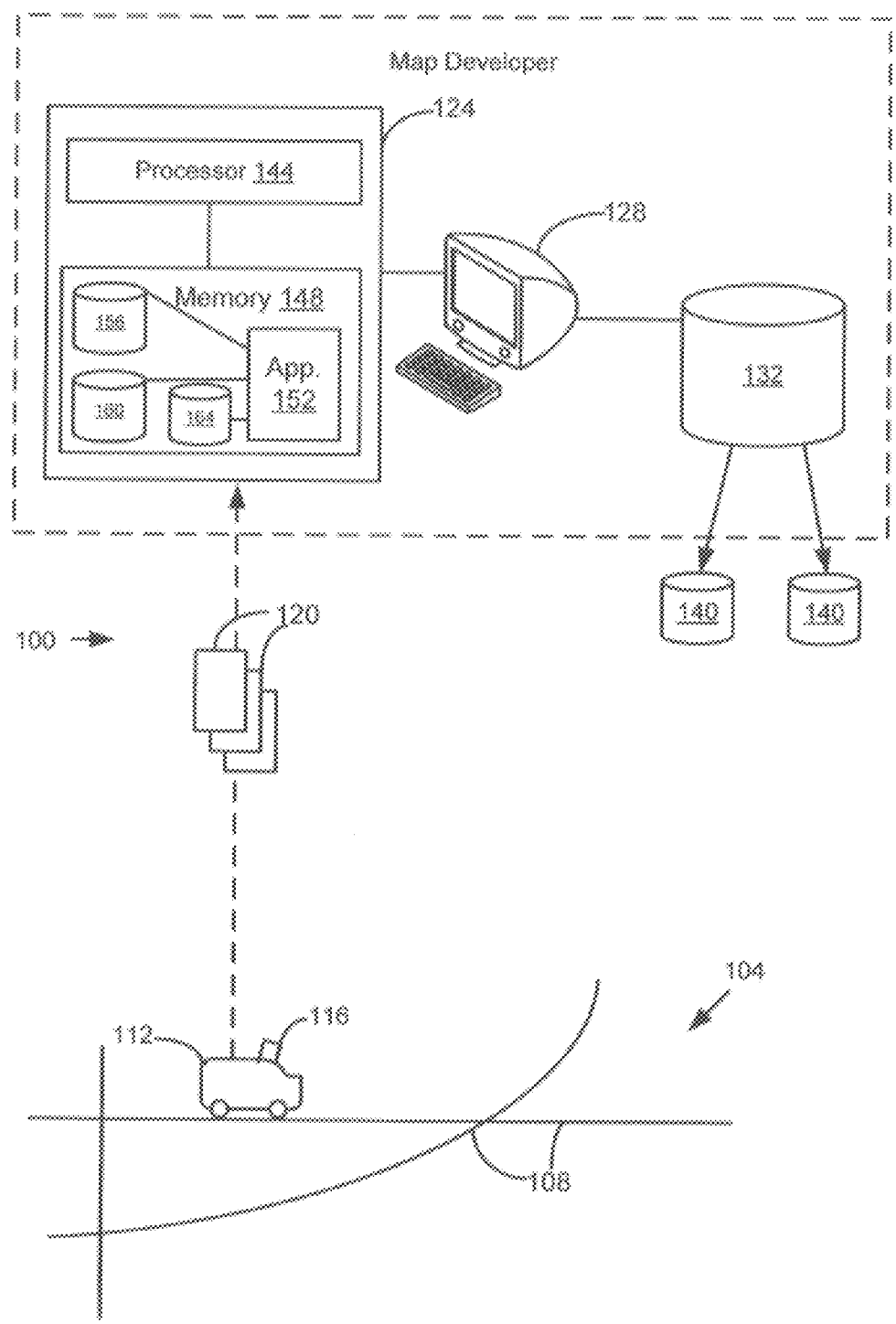
FIG. 1 is a diagram of a system for constructing a graphic model of a geographic object from an image, such as, for example, to enhance a navigation database.

FIG. 1 shows one embodiment of a system 100 for generating, constructing, or reconstructing one or more graphic models of respective geographic objects in images to develop or enhance a navigation database. The system 100 includes, but is not limited to, an object 112 travelling on a path network 108 in a geographic region 104, a processing device 124, a user interface or work station 128, and a geographic, map, navigation, and/or navigation-related database 132. Additional, fewer, or different components may be provided.

The object 112 is a vehicle, such as a car, truck, motorcycle, bicycle, Segway, or other transportation device or mechanical device used to move on the path network 108. Alternatively, the object 112 may represent a pedestrian, such as a human being or animal, that walks or moves along the path network 108. The path network 108 is a road network and/or a collection of other pathways. For example, the path network 108 is a road network made up of various roads. The roads may be used to drive vehicles on, such as local and neighborhood streets as well as highways. Also, instead of or in addition to traditional streets, the path network 108 may include bicycle roads or paths, walking paths, or other travel paths. The path network 108 is in a geographic region 104, such as a city, a suburb, a state, a country, and/or other geographic region.

The object 112 travels along or moves about the path network 108 to collect data associated with one or more paths or roads of the path network 108. For example, a supporting device or housing 116 is attached or connected with or carried by the object 112. The supporting device 116 may be or may include equipment to collect data representing an area about or around a road or path. For example, the collected data may be imagery or video/camera data (such as in the visible spectrum or other spectrum). In one embodiment, the supporting device 116 is a housing or container that is attached to a vehicle, and as the vehicle is on and/or moving on a road, equipment, such as a video and/or photograph camera, in the supporting device 116 collects or gathers data corresponding to the surrounding area. Alternatively, the supporting device 116 may be the camera itself or parts thereof. The supporting device 116 may be positioned at a frontend of the vehicle and may be angled to enhance collection. In other embodiments, the supporting device 116 may be positioned any place on the vehicle and in any direction.

The collected data is stored on one or more computer-readable media 120, such as a CD-ROM, DVD, flash drive, hard drive, or other tangible media suitable to store data. Different types of data may be stored on the same medium 120. Alternatively, separate media 120 may be used to store separate or different types of data. In one embodiment, photographs (such as digital or electronic photographs), video images, and/or other image data collected by the object 112 is stored in one or more media 120. Alternatively, the media 120 may be signals carrying or having image data. The collected image data or images may represent areas or regions about or around a path or road. The collected images may include geographic features, such as road or path markings, road or path signs (such as a traffic guide sign), points-of-interest ("POIs"), and other features or objects.

The collected image data, via one or more media 120, is sent to a map, geographic, and/or navigation data developer, such as NAVTEQ North America, LLC located in Chicago, Ill. For example, a medium 120 may be mailed to or brought to the map developer. Alternatively, some or all of the collected data may be transmitted to the map developer via a wireless and/or wired network. For example, the network may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection. The term "map developer" may also include third-party contractors.

The processing device 124 maintained by the map developer receives the collected image data, via the medium 120 or other means. The processing device 124 is one or more computers (such as a desktop tower or a laptop processing unit), processors, or other electronic processing systems or devices. The user interface or workstation 128 includes a display and input devices (such as a keyboard, mouse, voice recognition circuit, or other input device) that are associated with the processing device 124. In one embodiment, the processing device 124 and the user interface 128 are part of the same computer system or workstation. In another embodiment, the processing device 124 and the user interface or workstation 128 are separate computers. For example, the processing device 124 may be a server and the workstation 128 may be a separate computer in communication with the server 124.

The processing device 124 includes, but is not limited to, a processor 144, a memory 148, a graphics software application 152, a template database 156, a local dictionary or database 160, and a data, key, reference, and/or navigation library 164. The processor 144 is a general processor, application-specific integrated circuit ("ASIC"), digital signal processor, field programmable gate array ("FPGA"), digital circuit, analog circuit, or combinations thereof. The processor 144 is one or more processors operable to control and/or communicate with the various electronics and logic of the processing device 124 and/or the user interface or workstation 128. The memory 148 is any known or future storage device. The memory 148 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 148 may be part of the processor 144. The memory 148 is operable or configured to store collected image data and/or other data.

The processor 144 is configured or adapted to execute the graphics software application 152, which may be stored in the memory 148 or other memory. For example, the graphics software application 152 generates or constructs graphic models of geographic objects or features in images. In one embodiment, the graphics software application 152 may use optical character recognition ("OCR") in conjunction with the local library or database 160 to determine text of a geographic object. Also, the graphics software application 152 may compare features or components (such as invariant components relating to a road sign or other geographic features) in or from images to reference features or components in the data library or reference database 164 to detect a symbol or feature (such as an expressway sign shield symbol) of the geographic object, and then a template graphic model/icon or representation of the detected symbol may be retrieved from the template database or library 156. The graphics software application 152 may then generate or construct a full or partial graphic model of the geographic object based on the determined text, the identified symbols and/or graphic templates thereof, and/or other features or determinations.

The template database 156, the local dictionary or database 160, and the data library or reference database 164 may be part of the graphics software application 152 and/or may be stored in the memory 148 or other memory. For example, the template database 156, the local dictionary 160, and the data library 164 may be allocated space of the memory 148 or other memory that may be refreshed with updated data.

In one embodiment, the graphics software application 152 is used to analyze or perform process operations on a plurality of images collected by the object 112 to construct graphic models or representations of geographic features in the respective images. Geographic features, such as road or path markings, signs (e.g., traffic guide signs), POIs, and/or other objects, may be represented as graphic models to enhance or develop the navigation database 132. For example, the map developer may store, link, and/or associate geographic model data in or with the master database 132 or data thereof.

In one embodiment, the geographic database 132 includes data used for navigation-related services. For example, the geographic database 132 contains road segment and node data records that represent a road network, such as the path network 108. A node represents an end point of a road segment. The road segments and nodes may be associated with attributes, such as geographic coordinates, street names, address ranges, speed limits, turn restrictions at intersections, and other vehicle navigation attributes, as well as POIs, such as gasoline stations, hotels, restaurants, museums, stadiums, offices, automobile dealerships, auto repair shops, buildings, stores, etc. Alternatively, the geographic database 132 contains path segment and node data records or other data that represent pedestrian paths in addition to or instead of the vehicle road record data.

The geographic database 132 may be a master geographic database that is stored in a format that facilitates updating, maintenance, and development. For example, the master geographic database 132 or data in the master geographic database 132 is in an Oracle spatial format, such as for development or production purposes. The Oracle spatial format or development/production database may be compiled into a delivery format, such as a GDF format. The data in the production and/or delivery formats may be compiled or further compiled to form geographic database products or databases 140, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The generated graphic models associated with the databases 132 and/or 140 may be used in or by the navigation-related functions, such as displaying a graphic model of a traffic guide sign to an end user.

Figure 2:
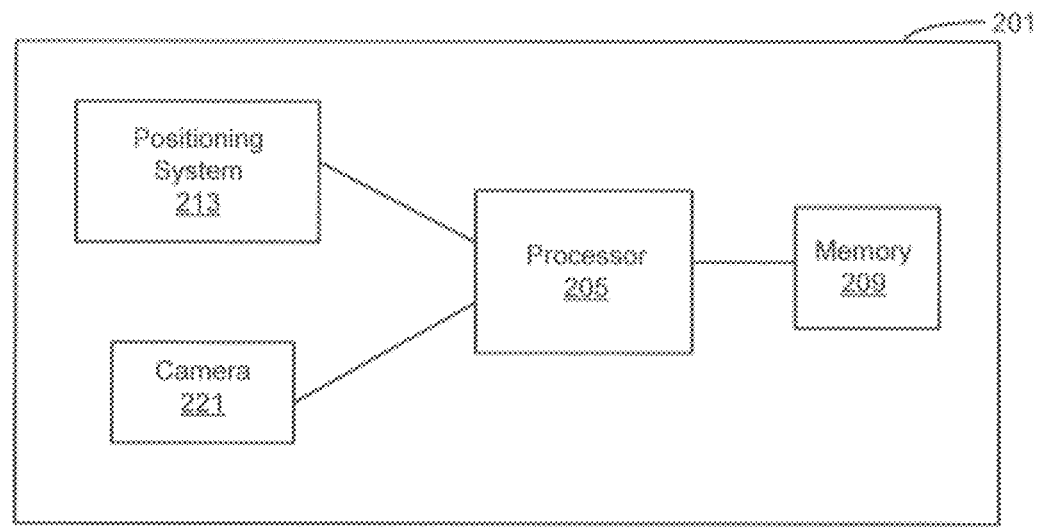
FIG. 2 illustrates components of a device that may be used in the system of FIG. 1.

FIG. 2 illustrates components of a device 201 used in the system 100. For example, the device 201 may be an embodiment of the object 112, such as a vehicle, or may be similar to the supporting device 116. In one embodiment, the device 201 is a support or housing that includes equipment to collect image data. For example, the device 201 is removably or integrally attached or connected to a vehicle. The device 201 is positioned at a top front end of the vehicle. Alternatively, the device 201 may be positioned on or in any part of the vehicle at any angle.

The device 201 includes, but is not limited to, a processor 205, a memory 209, a positioning system 213, and a camera system or device 221. Additional, fewer, or different components may be provided. For example, an input device may be provided. The input device may be one or more buttons, keypad, keyboard, mouse, stylist pen, trackball, rocker switch, touch pad, voice recognition circuit, or other device or component for controlling or inputting data in one or more of the components of the device 201. Also, laser devices, such as one or more Light Detection and Ranging ("LIDAR") devices, may be provided. While the components in FIG. 2 are shown as separate from one another, one or more of these components may be combined. Also, some of the components may be provided outside of the device 201. For example, if the device 201 is a housing attached to a vehicle, the positioning system 213, the processor 205, the memory 209, an input device, and/or other components may be in the vehicle or another part of the vehicle while the camera system or device 221 is in the device 201.

The processor 205 is a general processor, application-specific integrated circuit ("ASIC"), digital signal processor, field programmable gate array ("FPGA"), digital circuit, analog circuit, or combinations thereof. The processor 205 is one or more processors operable to control and/or communicate with the various electronics and logic of the device 201. The processor 205 is configured to operate the collection equipment, such as the positioning system 213 and the camera system or device 221. For example, the processor 205 sends commands to the various collection devices to collect data and synchronizes or manages the different components. Also, the processor 205 is configured to associate and store data from the collection devices into the memory 209.

The memory 209 is any known or future storage device. The memory 209 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 209 may be part of the processor 205. The memory 209 is operable or configured to store collected image data and/or other data. The memory 209 may be part of the computer-readable medium 120 or may be a separate memory.

The positioning system 213 is a global positioning system ("GPS"), one or more mechanical and/or electrical sensors, one or more gyroscopes, a local positioning system, one or more direction sensors, or other system or device for providing position data, such as location data (e.g., longitude, latitude, altitude, and/or other coordinates) and/or direction data, of the device 201, components thereof, or an attached object, such as a vehicle. The positioning system 213 may include an inertial measurement unit ("IMU"), or the IMU may be separate from the positioning system 213. An IMU may include one or more accelerometers, gyroscopes, and/or other components. For example, the IMU detects current rate of acceleration as well as changes in rotational attributes, such as pitch, roll, and yaw. Data from the IMU may be used for error corrections, data compensation, and other purposes.

The camera system 221 includes one or more cameras used for taking pictures or videos of a surrounding area. For example, the camera system 221 includes a video camera that records video data (such as in the visible light spectrum or other spectrum) representing geographic features of and about a road or path as a vehicle drives along the road or path. The camera system 221 may also capture still photographs separate from the video data. The camera system 221 is able to capture different colors and associated text of geographic features.

Figure 3:
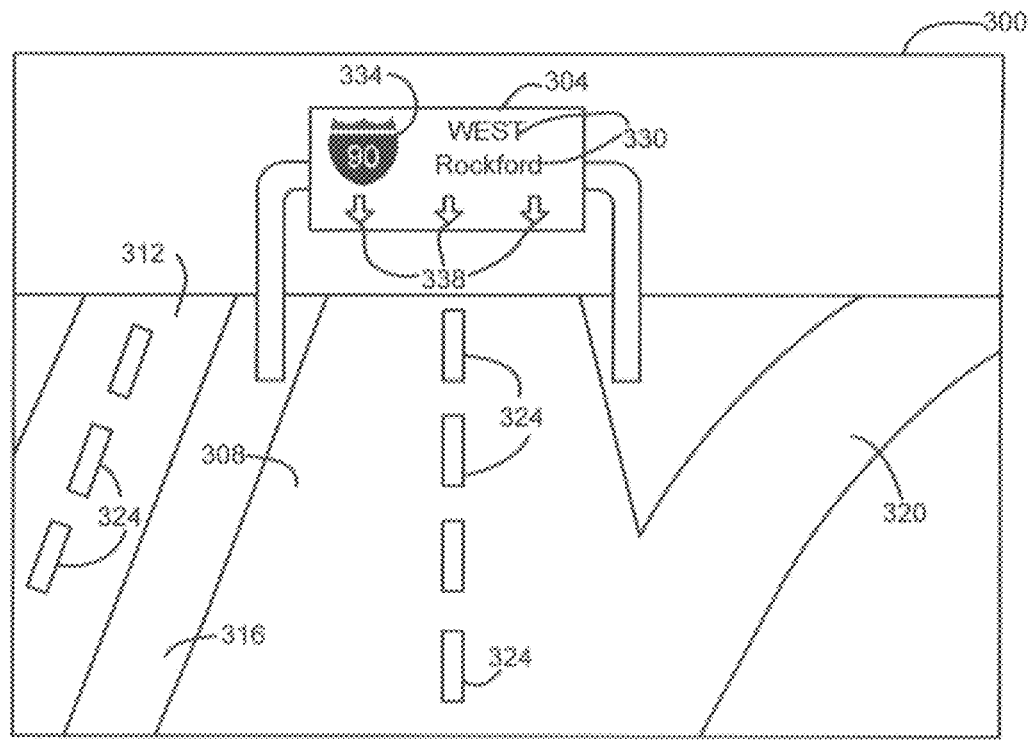
FIG. 3 is an embodiment of an image that illustrates one or more geographic features or objects.

FIG. 3 is an embodiment of an image 300 that illustrates geographic features or objects in an area or region. The image 300 is in a bitmap, JPEG, GIF, and/or other image format. For example, the image 300 is a raster image. In one embodiment, the image 300 is an image of a plurality of images captured or collected by the camera device 221 or other camera while driving along the road represented in the image 300. The image 300 includes image representations of various geographic features/objects along or about a road 308 and a road 312. For example, the image 300 includes representations of a traffic guide sign or road sign 304. The road sign 304 may be a rural road sign, highway or expressway sign, or other path sign. For example, the road sign 304 is a highway or expressway sign positioned over the road or highway 308. The road sign 304 includes text 330, direction symbols or arrows 338, and a shield, logo, or symbol 334. The symbol 334 is an interstate or other road identification symbol. More or less features may be provided in the road sign 304. Also, the image 300 includes lane markings 324 and a road divider 316 between the roads 308 and 312. An exit ramp, pass, or road 320 is also represented or shown in the image 300. The image 300 is stored, such as in a medium 120, and then sent to the map developer.

Figure 4:
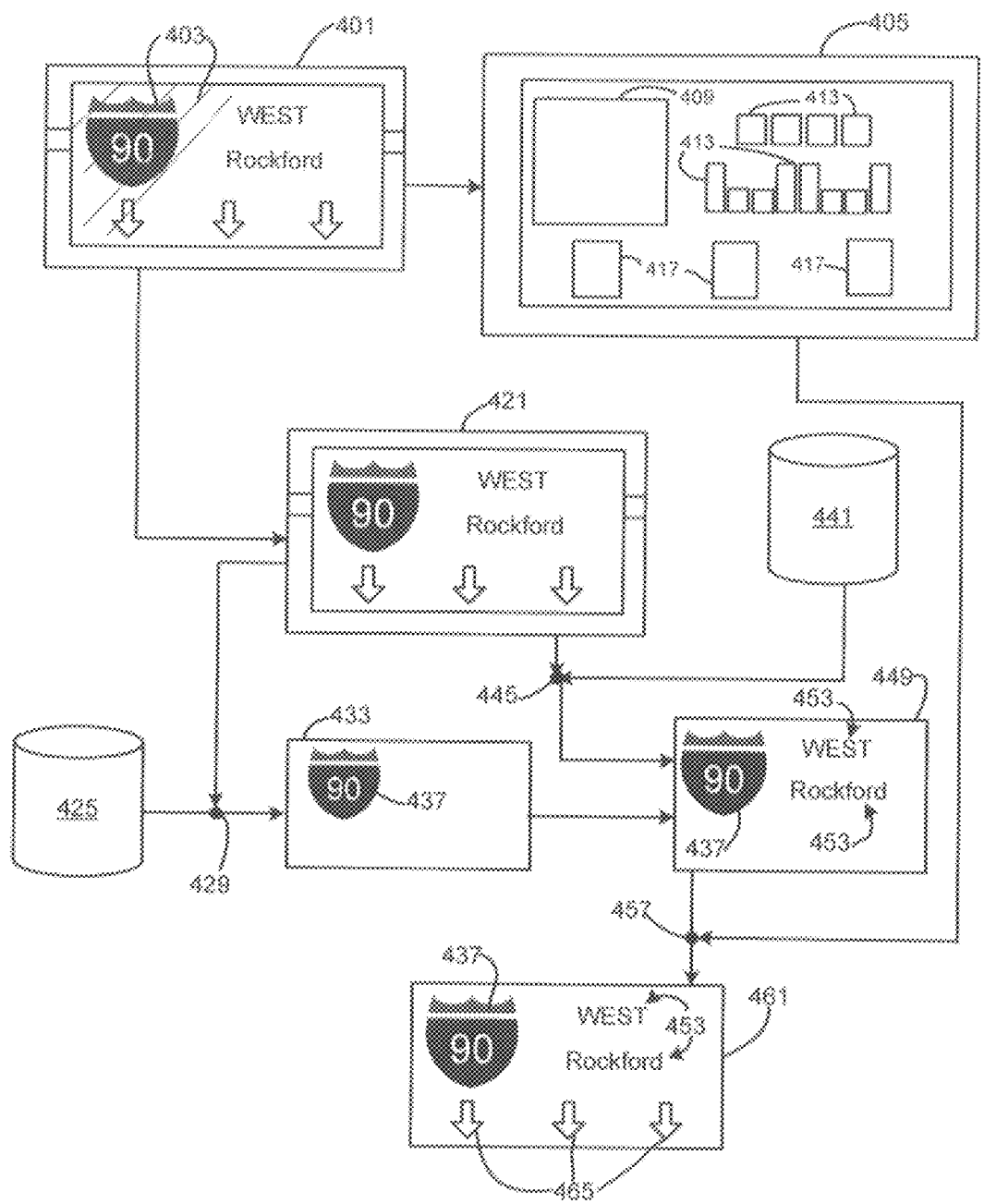
FIG. 4 is a pictorial flow diagram corresponding to generating a graphic model of a geographic object from an image, such as the image of FIG. 3.

FIG. 4 is a pictorial flow diagram corresponding to generating a graphic model of a geographic object, such as the road sign 304, from an image. In one embodiment, an image portion or section 401 of a received or collected image, such as the image 300, is selected. For example, the image representation of the road sign 304 is focused on or selected, such as via the processing device 124 and/or the user interface or workstation 128. The lines 403 in the image section 401 illustrate or show that the image of the road sign 304 may not be that clear, clean, and/or focused or may be darker or lighter relative to nominal or preferred illumination.

A section 405 shows an image segmentation performed on the selected section 401. For example, the image of the road sign undergoes image segmentation in which different parts or features of the road sign are identified by separate bounding boxes. In one embodiment, the image segmentation results in a bounded area or box 409 corresponding to the symbol 334, bounded areas or boxes 413 corresponding to individual text characters of the text 330, and bounded areas or boxes 417 corresponding to the arrows 338. The image segmentation is used for later processes.

In parallel to the image segmentation, a section 421 shows or illustrates image enhancement. For example, the distortions or imperfections 403 are removed from the image section 401 resulting in a cleaner or enhanced image of the road sign 304. The image enhancement may provide better resolution, adjust illumination or brightness, provide better focus, and/or other enhancement. Also, the enhancement may occur before the image segmentation, and the enhanced image may be used for segmentation.

At an operation point 445, OCR may be performed on the enhanced image 421. For example, the text 330 is determined based on one or more OCR scans of the enhanced image of the road sign 304. In one embodiment, to facilitate or augment the OCR, a local dictionary 441, such as the local dictionary or database 160, is generated and used. For example, texts or words of geographic features or attributes stored in or associated with the navigation database 132 are retrieved based on location information. In one embodiment, the location or real-world coordinates corresponding to the image 300, 401, or 421 are determined or identified (e.g., via stored or collected data from the positioning system 213). Using the latitude and longitude coordinates and/or other coordinates, the area or region associated with the image is identified. Then based on predetermined, selected, or specified boundaries or a configurable/selectable area around the identified location, the terms, words, or text stored in the navigation database 132 or data thereof within the selected boundaries are retrieved. Accordingly, a local dictionary or words or texts is generated, updated, or refreshed. The OCR may be enhanced by using the local dictionary to determine text or text characters, such as the text 330.

At a parallel operation point 429, a process to determine invariant components (e.g., scale-invariant, rotation-invariant, brightness-invariant, and/or other invariant or independent components) of the enhanced image 421 may be performed to determine a symbol, such as the symbol 334, of the geographic object.

Figure 5:
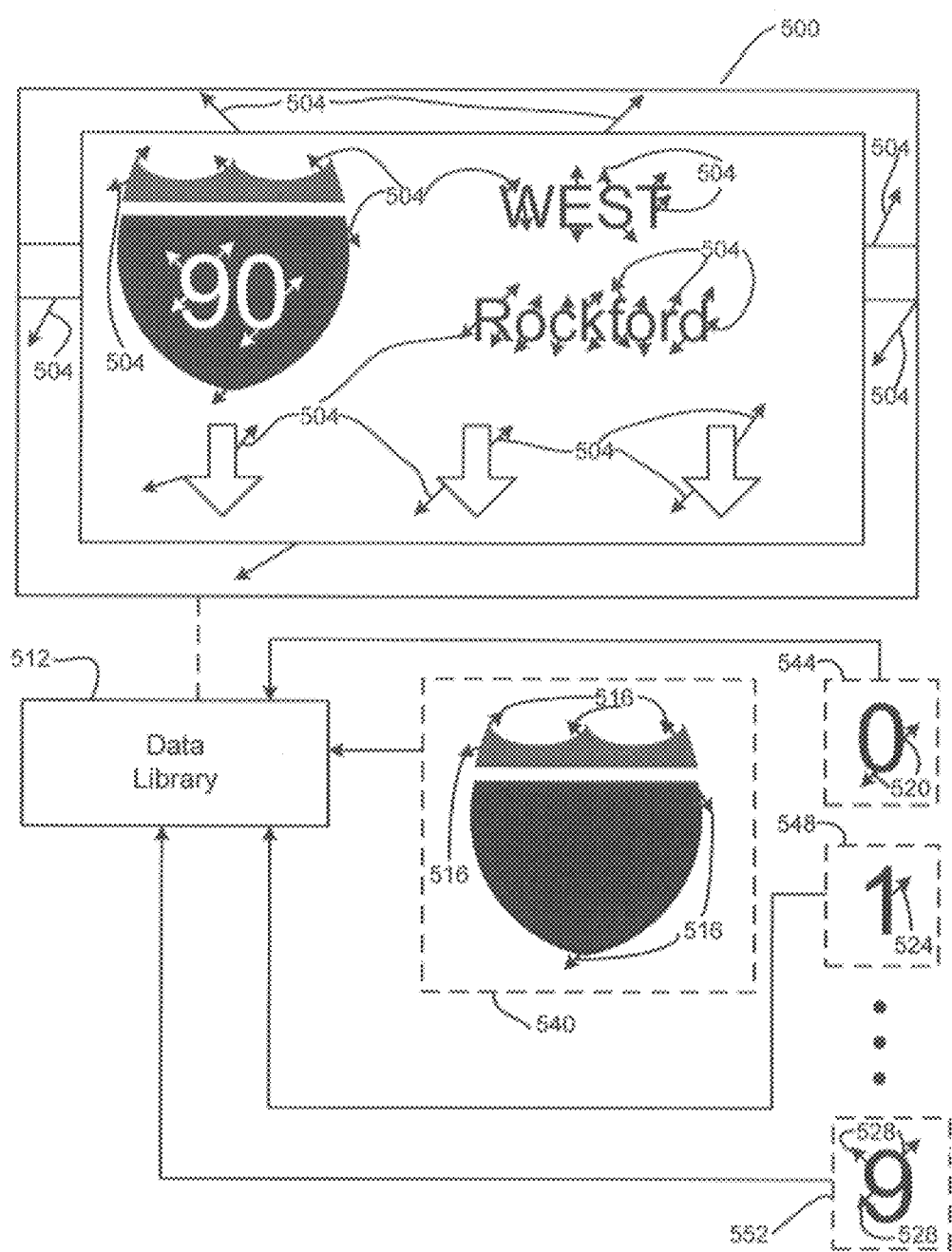
FIG. 5 is an embodiment of a processed image illustrating invariant components and a relationship with a data library.

For example, FIG. 5 illustrates an embodiment of a processed image 500 in relation to a data library 512, such as the data library 164, corresponding to determining geographic features based on invariant components. The processed image 500 may be the image 421 that undergoes a process to determine substantially invariant or independent components or features corresponding to geographic objects and/or features thereof in the image. Invariant components or features are points, gradients, vectors, and/or other components of objects or portions thereof in an image that are invariant to scale, rotation, illumination or brightness of the objects or portions thereof. For example, invariant components of an image or objects in the image may be determined by using a scale invariant feature transform ("SIFT") or other invariant component generation techniques or methods.

In one embodiment, for illustrative purposes, invariant or independent components/features of the image 500 are represented by gradient vectors 504. For example, different invariant components or gradient vectors 504 correspond to or are associated with different parts or features of the road sign 304. Some gradient vectors 504 correspond to the text 330 or individual text characters thereof, some gradient vectors 504 correspond to the symbol 334, some gradient vectors 504 correspond to the arrows 338, and some gradient vectors 504 correspond to physical portions of the road sign 304. The symbol 334 may have a distinctive form, and so the corresponding gradient vectors 504 of the symbol 334 and correspondence between the gradient vectors of the symbol 334 also have a distinctive quality or association.

For example, the gradient vectors 504 corresponding to the symbol 334 are invariant components that are independent or substantially invariant to scale, rotation, and/or brightness of the symbol 334. The gradient vectors 504 of the symbol 334 would be substantially similar to gradient vectors of other images of the symbol 334 or similar symbol, even if the other images are more or less bright, show a different size or scale of the symbol, and/or show a rotated symbol, such as rotation in the in-plane. Accordingly, different images may be analyzed to determine if the image includes a desired symbol, like the symbol 334, based on these invariant components.

In one embodiment, the different invariant components or gradient vectors corresponding to the image 500 are compared or matched with reference components 516, 520, 524, and 528. For example, the reference components 516 are invariant components or gradient vectors corresponding to a reference symbol or symbol shape 540, such as the symbol pattern of the symbol 334. The reference components 520 are invariant components or gradient vectors corresponding to a reference text character 544, such as the number 0. The reference components 524 are invariant components or gradient vectors corresponding to a reference text character 548, such as the number 1. The reference components 528 are invariant components or gradient vectors corresponding to a reference text character 552, such as the number 9. Other reference invariant components for letters, other numbers, other text characters, or other symbols may be stored.

The reference symbols or characters 540, 544, 548, and 552 may be respective images of a sign, symbol, or text character thereof that are processed (such as using SIFT or other techniques used for the image 500) to determine the respective invariant components 516, 520, 524, and 528, and the invariant components are saved or stored in the data library 512 as reference components. Accordingly, different determined invariant components of various images may be matched or compared to the reference components to determine or identify a desired geographic feature (such as the symbol 334 and/or text characters thereof) in one or more of the various images, even if the rotation, scale, and/or illumination of the images or objects therein differ. For example, after or while comparing the gradient vectors or invariant components corresponding to the image 500 to the data library 512, it is determined that the image 500 includes the symbol 334 or similar symbol and one or more individual text characters (such as the numbers 9 and 0) based on a match with some or all of the reference invariant components. In an alternate embodiment, the text or numbers or characters thereof are determined using OCR or other process instead of SIFT or an invariant component process.

Referring back to FIG. 4, after it is determined that a certain symbol or symbol shape exists, a template image or graphical representation 437 of the symbol is retrieved from a database 425. The database 425 is similar or the same as the template database 156. For example, the template database 425 includes the graphical icon 437 of an expressway or highway symbol or pattern that corresponds to the symbol 334. Template icons or graphical representations of text or numbers, such as the numbers 9 and 0, may be retrieved from the template database 425 or other database. Then a graphical representation or model 433 is constructed or generated having the graphical icon 437. The graphical model 433 is a graphics data model in the shape of the road sign 304.

A graphic model 449 is further generated based on the graphic model 433. For example, based on the OCR and determination of words or text of the road sign 304 (via the enhanced image 421), graphical icons 453 representing the identified letters or words are retrieved. The text graphical icons 453 may be retrieved from the database 425 or other database. The graphical icons 453 are then placed on the graphical model 433 along with the graphical icon 437 to produce the graphic model 449.

Further processes may be occur at the operation point 457. For example, arrow detection may be performed on the image 401 or 421. In one embodiment, binary matching is used to determine if one or more arrows, such as the arrows 338, exist in the image. Alternatively, SIFT or an invariant component process may be used to determine arrows. However, because the pattern of an arrow may not be that distinctive, the occurrence of false positives for detecting arrows using SIFT may be higher.

Once arrows are detected or determined, graphical icons 465 of arrows may be retrieved, such as from the database 425 or other database. The image segmentation performed earlier may be used to provide an accurate layout of the different graphical icons so that the graphic model of the road sign 304 may appear similar to the image representation of the road sign 304. Accordingly, the graphic icons 437, 453, and 465 are positioned and/or sized based on the image segmentation and corresponding bounding boxes resulting in a constructed graphic model 461. Color patterns and selections may be made based on hue determinations of the image representation of the road sign 304.

The different operations, such as the parallel processes, of FIG. 4 may be mixed and matched or changed in order. For example, image segmentation may be used for enhancement, OCR, SIFT, and/or other procedures. Also, an enhanced or non-enhanced image may be used for the different operations. Additionally, more, fewer, or different sections or segmentations may be focused on for different procedures. For example, one or more areas or regions of the image representation of the geographic object or the whole image may be selected for OCR, SIFT, or other processes. In one embodiment, at least one area or segment may be focused on for OCR and at least another or different area or segment may be focused on for SIFT or invariant component process.

The graphic model 461 is a data model corresponding to the raster image representation of the road sign 304. The graphic model 461 is in a portable document format ("PDF"), scalable vector graphics ("SVG") format, post script ("PS") format, other vector graphics format, and/or other graphical model format. For example, the graphic model 461 is in a SVG format. Also, the individual template icons or symbols may also be in a SVG format or similar format. The SVG format is an open standard extensible markup language ("XML") format that gives access to graphics content, such as paths, text, fills, etc. For example, color fill, text, and other components of the image may be represented by tags in the SVG or XML format. Unlike the raster or pixilated image of the road sign 304 in the image 300, the graphic model 461 may controlled or manipulated in a variety of ways, such as placement or movement of features on or in the graphic model 461, changing shape or color of the graphical model 461 or features thereof, presenting the graphical model 461 in 2D, 2.5D (perspective view), 3D, or 4D, and/or other graphical model benefits. In one embodiment, instead of superimposing a raster image of the road sign 304, the graphical model 461 is used for display to users. For example, the graphical model 461 may match a look or visuals of an animation or visual display or presentation of a region or area.

Figure 6:
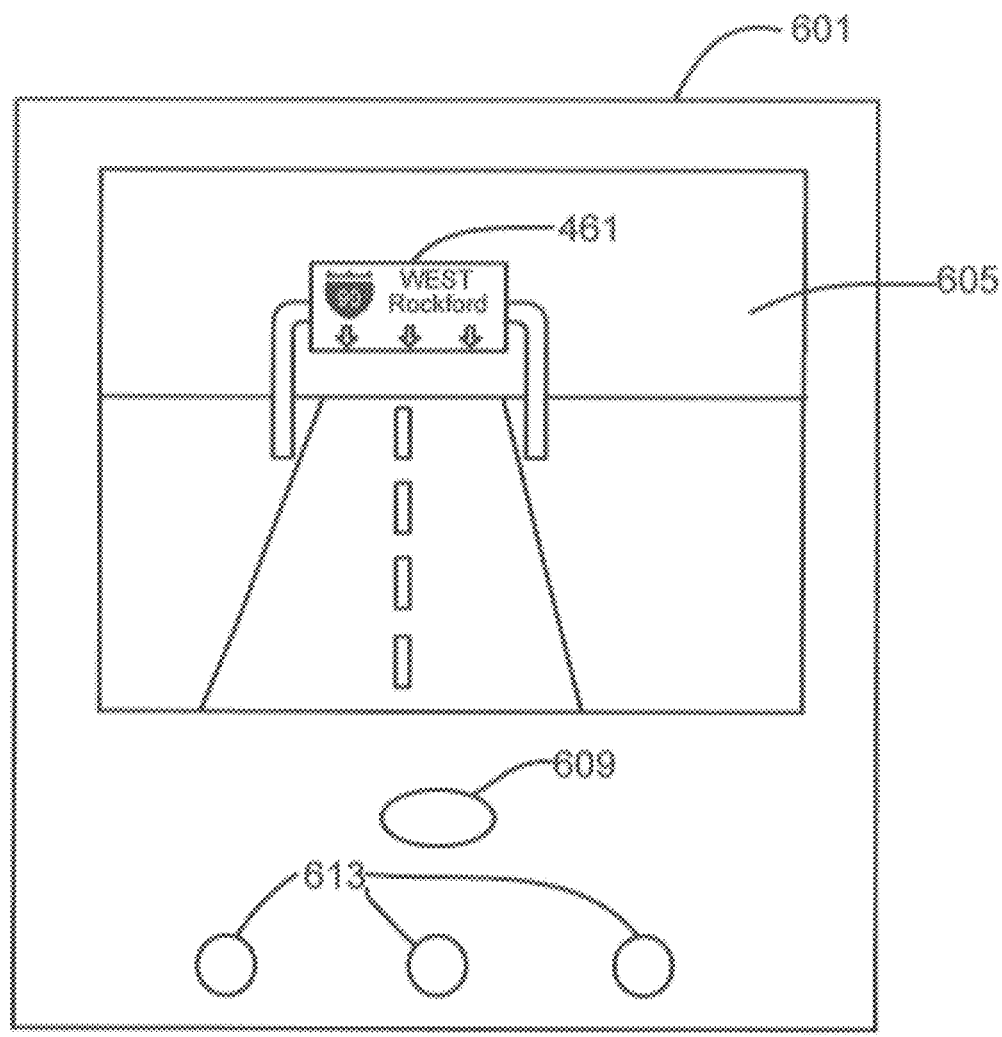
FIG. 6 is an embodiment of an end user device configured to implement the graphic model generated by the system of FIG. 1.

FIG. 6 is an embodiment of an end user device 601 configured to implement the graphic model 461 or other graphic model. For example, the device 601 is a cellular phone, mobile phone, smart phone, personal digital assistant ("PDA"), handheld computer, a watch, a camera, a personal navigation device ("PND"), a portable navigation device, and/or any other electronic device. For example, the device 601 is a cellular telephone or smart phone, such as a cell or smart phone provided by Nokia Corporation located in Espoo, Finland. The device 601 includes a display 605, a navigation button 609, and input buttons 613. More or fewer components may be provided. For example, a camera and other audio/visual components may be provided. Also, the device 601 may include the database 140 and/or may be in communication with the database 140 or the master database 132.

In one embodiment, a navigation display or animation is presented on the display 605. For example, an end user is using the device 601 for navigation instructions, map display, and/or other navigation-related functions. Based on a selected destination, the user may be routed to or on a road including the road sign 304. Accordingly, the generated display or animation providing guidance and/or directions includes the graphical model 461 or other model version to the end user.

Figure 7:
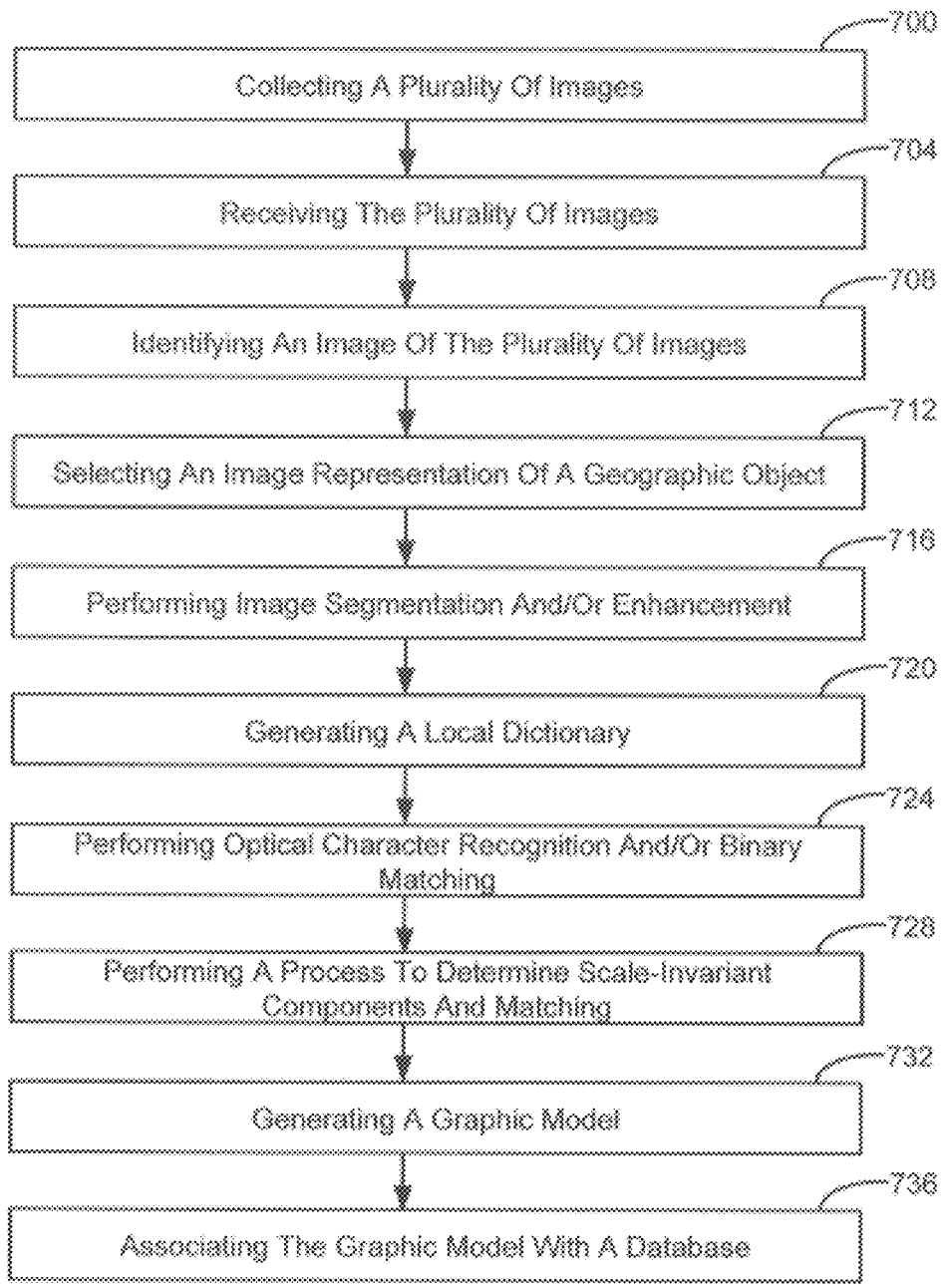
FIG. 7 is a flowchart of a method for constructing a graphic model of a geographic object from an image, such as the image of FIG. 3.

FIG. 7 is a flowchart of a method for constructing, reconstructing, or generating a graphic model, such as the graphic model 461, of a geographic object from an image, such as, for example, to enhance or develop a navigation database. Fewer or more steps or acts may be provided, and a combination of steps may be provided. Also, the steps or acts may be performed in the order as shown or in a different order. The method is implemented by the system and/or devices described herein or by different devices or systems. Also, the construction or generation of the graphic model may be fully or partially automated via data processing.

A plurality of images of geographic features are captured or collected by a camera, such as the camera system 221 (Step 700). For example, the map developer employs a driver to drive a vehicle, such as the object 112, on one or more roads to collect data to develop the map database 132. In one embodiment, image data, such as photographs and/or videos, of geographic features or areas about roads or paths are collected. Other data including positioning information or data, such a GPS data (e.g., latitude, longitude, and/or altitude) corresponding to the vehicle or data collection devices supported by the vehicle are collected. In an alternate embodiment, instead of or in addition to driving or riding a vehicle to collect images, a pedestrian may use a supporting device, such as the device 116 or 201, to collect the image data and/or other data. For example, a pedestrian carries or puts on a backpack or other transportation device (which may support the device 116 or 201) while walking on a path to collect data corresponding to the path.

The images and/or other data are received, such as by a processing device of the map developer, e.g., the processing device 124 (Step 704). For example, the captured or collected images and/or other data are sent to the map developer. In one embodiment, the image data is associated with position data and/or other data, and all the data is sent in the same data file. Or, different data is sent separately with links or indicators associating the different data with each other. In one embodiment, images, such as the image 300, are stored on a computer-readable medium, such as the medium 120, and other collected data are stored on different media. Alternatively, different types of collected data may be stored on the same computer-readable medium. The computer-readable media are delivered to an office or facility of the map developer. For example, after a vehicle is finished collecting data, it returns to a facility of the map developer. Or, the media may be mailed or sent by carrier to a certain office or facility. The data is then applied, entered, or inputted into the processing device 124 or other device. Alternatively, the collected data is transmitted to the map developer and/or device thereof via a wireless or wired network.

An image, such as the image 300, of the plurality of images is identified or selected (Step 708). For example, an image including a desired geographic object or feature, such as the road sign 304, is identified or selected so that a graphic model, such as the graphic model 461, may be generated or constructed from the image. In one embodiment, automatic detection techniques may be utilized to determine if an image contains a certain geographic object, such as a road sign. For example, SIFT techniques or invariant component processes may determine if a general or specific geographic feature exists in an image or image frame. Techniques and methods for detecting geographic features in images are disclosed in U.S. patent applications, Ser. No. 12/490,538, entitled "DETECTING GROUND GEOGRAPHIC FEATURES IN IMAGES BASED ON INVARIANT COMPONENTS,"; Ser. No. 12/490,575, entitled "DETECTING COMMON GEOGRAPHIC FEATURES IN IMAGES BASED ON INVARIANT COMPONENTS,"; and Ser. No. 12/490,555, entitled "DETECTING GEOGRAPHIC FEATURES IN IMAGES BASED ON INVARIANT COMPONENTS," the entire disclosures of which are incorporated by reference herein. Manual operations and processes may also be used. For example, a map developer or employee thereof may scan or review the images received, such as via the user interface 128. Then, after an image including a desired geographic feature is discovered, the map developer or employee thereof selects the image for further processing. Or, the detection techniques, such as the ones mentioned above, may identify an image frame or image and send a text file or indication information to the map developer. The map developer or employee thereof uses the indication information to select or view identified or detected images to confirm that a desired geographic object is included in the identified images.

A image representation of a geographic object, such as the road sign 304, in the identified image is selected (Step 712). For example, automatic operations for determining a position or area or region where the desired geographic object is within the image is determined. Techniques, such as image segmentation, boundary detection, or other processes may be used. Alternatively, the map developer or employee thereof may use an input device or the user interface 128 to select a region or bounded area around the geographic object. For example, the area around the image representation of the road sign 304 may be selected, such as via a mouse, keyboard, or other input device (e.g., the rest of the image 300 around the road sign 304 may be cropped). Accordingly, the image representation of the geographic object is selected or focused upon.

Image segmentation and/or enhancement may be performed on the selected area and/or image representation of the geographic object (Step 716). For example, different symbols, text, or other features or areas thereof of the image representation of the geographic object may be defined or bounded, such as in section 405 of FIG. 4. In one embodiment, areas or regions of symbols, like the symbol 334 and the arrows 338, are defined by a geometric boundary, such as the respective boxes 409 and 417. Areas or regions of text, such as the text 330, may also be defined by bounding boxes or shapes, such as the boxes 413. In one embodiment, each text character, such as a number or letter, is segmented. Or, a full word or phrase may be associated with one bounded area or box/shape. Known or future image segmentation techniques or processes may be used. Also, manual segmentation may also be incorporated. The image segmentation may be used for further processes related to generating or constructing a graphic model, discussed below.

Furthermore, image enhancement may be performed before, during, or after the image segmentation. For example, if the selected image representation of the geographic object or the identified image thereof, such as the image 300, is cloudy, unfocused, exhibiting poor illumination or high brightness, or other image quality issues, then the image or area thereof may be enhanced using known or future techniques. For example, pixel resolution, focusing techniques, brightness or illumination compensation, and other processes may be performed to generate a better or cleaner image or image representation thereof.

A local dictionary or database, such as the local dictionary 160, may be generated or created (Step 720). For example, geographic location or position information of the identified image, such as the image 300, is determined or identified. In one embodiment, the geographic coordinates, such as latitude, longitude, and/or altitude, captured by the positioning system 213 and that are associated with the identified image are retrieved or identified. Based on the geographic coordinates or other position information, the area or location of the selected geographic object in the image is known. Accordingly, a local dictionary corresponding to the location may be developed or generated. For example, predetermined boundary constraints or region may be used. The map developer may designate a certain radius around the location or coordinates to act as the local area. Or, other geographic boundaries, such as a rectangular box or other shape, around the identified location may be used. The area around the location may be configurable. The map developer may change the radius or boundary limits.

Text data or words of geographic features within a configurable area around a location associated with the identified image are retrieved from a navigation database. In one embodiment, text, words, terms, or other features stored in a map database, such as the map database 132, that are associated with the selected or predetermined area may be retrieved. For example, text characters, words, phrases, data, or terms associated with road segment records, node records, or other data records within the spatial area or local area defined by the predetermined or configurable boundaries are retrieved or queried (e.g., the data records in the database 132 may be spatially and/or geographically organized, such as in a parcel format). The retrieved text or words are stored in a database or memory to form, refresh, or update the local dictionary. The local dictionary may be used to facilitate OCR.

OCR and/or other processes, such as binary matching, may be performed, such as on the selected image representation or enhanced version thereof (Step 724). For example, OCR is performed on an enhanced image representation of the desired geographic object, such as the road sign 304. The OCR uses the generated local dictionary to facilitate as well as assist in text determination. Because, text or names of a city, POI, or other geographic object may be prevalent in a certain area, the data records corresponding to that geographic area may include words or text associated with the city or POI. Accordingly, the chances that the generated local library includes the text associated with the city or POI are higher. Therefore, when OCR is performed, the local dictionary is used to help eliminate false positives as well as help determine the appropriate text or words in a faster or more efficient manner (e.g., the text "Rockford" may be prevalent in data records in the local area corresponding to the identified image, and so the matching or OCR operations to determine the text "Rockford" may be facilitated based on the use of the local dictionary. Meaning, the OCR matching may perform correspondence processes between the image representation of the geographic object with the local dictionary to facilitate the determination that the term or text Rockford exists in the geographic object). Also, by using a local dictionary, words, text, and/or characters not likely to be associated with the local area or geographic object may be avoided or not used to facilitate processing speed or determinations. Alternatively, other text, words, or databases may be used in conjunction with the local dictionary. Or, the local dictionary may not be used. The determination of text or words may be used in processes to generate the graphic model, as discussed below. Also, image segmentation may be used to assist the OCR operations.

Furthermore, binary matching may be performed on the selected image representation of the geographic object. For example, certain symbols or features of the geographic object, such as arrows, may be determined based on binary matching. Certain areas or regions, such as determined by the image segmentation, are analyzed to determine if simple or other features are present. In one embodiment, arrow symbols may be determined by matching correspondence between binary values. For example, a segmented block may be processed to identify either a black area (identified by 0's) or a white area (identified by 1's). By comparing the 0's and 1's or different binary areas to templates of arrows or other symbols, it is determined if an arrow symbol exists as well as what type or direction of the arrow symbol. Other techniques may be used to determine arrow symbols, simple symbols, and/or other features. For example, SIFT may be used. However, because SIFT or other invariant component detection processes are more effective on more distinctive patterns, the use of SIFT for arrow detection may cause higher false positives or lower accuracy. The determination of the arrow symbols or simple symbols may be used in processes to generate the graphic model, as discussed below.

A process to determine invariant components, such as scale-invariant components and/or the components 504, is performed, such as to identify a feature or symbol, like the symbol 334, of the geographic object, and matching processes may also be performed (Step 728). In one embodiment, SIFT is used to determine scale-invariant features or data components of the selected image representation of the geographic object. For example, initially, the select image or image representation, such as the image representation of the road sign 304, is used to produce a plurality of difference images. Difference images are produced by successively blurring the image to produce a blurred image and then subtracting the blurred image from the initial image resulting in a difference image. Blurring may involve two one-dimensional Gaussian function convolutions in the horizontal and vertical directions.

Various difference images at different levels are produced to determine components or features that are invariant or substantially invariant to scale of objects in images. For example, amplitude extrema, such as pixel amplitude extrema, are located or identified in each difference image. In one embodiment, an amplitude, such as an amplitude value, of a pixel is compared to amplitudes of neighboring pixels, such as eight neighboring pixels. The comparison determines whether or not the pixel has an amplitude greater than or less than all of its neighbors. Each pixel of each difference image is considered to determine whether such pixel represents a maximum or minimum relative to its neighbors in its own level as well as in adjacent levels. The extremum point or pixel is a scale-invariant component or feature of the image. For example, if the extremum point corresponds to an object in an image (such as the symbol or shield 334), then the extremum point will be substantially the same for other images including that object or similar objects even if the images or objects within are at different scales or sizes.

Once an extremum point or pixel is determined, its location is stored for further processing. For example, a region is defined as a plurality of locations that are arranged in an orientation about the extremum point. The region can be any size and may depend on a desired resolution. In one embodiment, 16 subregions are defined in which each subregion includes 16 pixels in a 4×4 format. Accordingly, the region corresponds to a 16×16 pixel grid.

The extremum point in the region may be represented by different angular orientations. For example, eight orientation ranges may be specified. Elements of the different angular component sets may have a one to one correspondence with respective subregions, and the elements may act as component descriptors. The angular component sets and their associated descriptor components are then stored. In one embodiment, the angular component sets and descriptor components are used as rotation independent or invariant identifiers of the extremum point. For example, if the extremum point corresponds to an object in an image (such as the symbol or shield 334), then the extremum point may be matched to substantially similar extremum points of other images including the object or similar object even if the images or objects within are rotated or are at different in-plane angles, based on the angular component sets and descriptor components.

A gradient vector, such as the gradient vectors 504, about the extremum point is generated. In one embodiment, pixels around the extremum point have vectors pointing in various orientations, and the vectors are added together to produce a resultant vector, the angle of which corresponds to the extremum orientation. The gradient vector is a 128 element vector including information about the eight sets of component subregion descriptors, neighborhood information, and other identifiers. The gradient vector or components thereof may be substantially invariant or independent to brightness or illumination. For example, if the extremum point or gradient vector corresponds to an object in an image, such as the symbol or shield 334, then the extremum point or gradient vector will be substantially the same for other images including that object or similar object even if the images or objects are at different illumination or brightness levels because difference or gradient components are being analyzed.

Accordingly, the gradient vector is substantially invariant to scale, rotation, and brightness or illumination. Further description and details on the process of determining invariant components of images or objects therein, such as using SIFT, may be provided in the United States Patent, U.S. Pat. No. 6,711,293, entitled METHOD AND APPARATUS FOR IDENTIFYING SCALE INVARIANT FEATURES IN AN IMAGE AND USE OF SAME FOR LOCATING AN OBJECT IN AN IMAGE, which is hereby incorporated by reference. Other scale-invariant, rotation-invariant, and/or brightness-invariant components or data components may be determined using other techniques or methods that may be similar to or different than SIFT.

The determined invariant components of the image are compared or matched with reference invariant components. In one embodiment, the gradient vectors corresponding to the image representation of the geographic object are compared to the reference invariant components or gradient vectors, such as the components 516, 520, 524, and 528, in a data or reference library, such as the map data or navigation library 512 or 164. The comparison involves matching gradient vectors as well as comparing correspondence of neighboring gradient vectors, such as different gradient vectors of a symbol. A matching threshold or level may be used. Because of the unique correspondence between the gradient vectors (due to the unique form or pattern of the symbol, such as the symbol 334), the matching of the gradient vectors 504 and the respective reference gradient vectors is facilitated. Because invariant components or gradient vectors are being compared, the scale, rotation, and/or brightness of the symbol 334, the road sign 304, or the image 300 do not substantially matter.

The reference invariant components, such as the gradient vectors 516, 520, 524, and 528, may be determined before or after collecting the plurality of images by the object 112. In one embodiment, one or more desired geographic objects or features, such as one or more signs or symbols thereof (e.g., similar to the sign 304 or symbol 334), in a reference image is identified. For example, a map developer uses one or more of the images collected by the object 112 or other images to find the desired geographic features. Then, a process or algorithm to determine substantially invariant components is applied on the desired geographic features to determine invariant components thereof. SIFT or other techniques used above may be utilized. The determined invariant reference components are stored or saved in a data or reference library, such as the data library 164 or 512.

Accordingly, a geographic object in an image, such as the symbol 334 and/or one or more text characters or text pattern/sequence thereof, is identified or determined based on the comparison or matching with the reference invariant components. Clustering techniques may also be used with SIFT or invariant component processes. The determination or identification of the object or symbol is used in further processing to generate the graphic model.

A graphic model, such as the graphic model 461, is constructed, created, or generated based on the determination of text, symbols, and/or other features (Step 732). In one embodiment, template symbols and/or text or text characters are retrieved from one or more databases, such as the template database 156 or 425, based on the determinations made above. For example, after the symbol 334 is identified or determined, a corresponding template graphic icon of the symbol (such as a interstate graphic icon or pattern in an SVG format) is retrieved from a template database. The template icon may be a graphic model of the pattern of the symbol. Also, the graphic model may include certain text patterns, such as the word INTERSTATE, across the top of the graphic symbol. Other numbers or letters may be associated with the graphic icon. Or, template or graphic icons of text characters may be added to the graphic icon of the symbol. For example, graphic icons of the number 9 and 0 may be retrieved from the same or different template database and placed or added to the graphic icon or model of the symbol.

Similarly, based on the OCR and text determination, graphic icons of corresponding text, words, or characters may be retrieved from the same or different template database. Also, graphic icons of the determined arrows or simple symbols may be retrieved from the same or different template database. The graphic icons of the text and arrows may also be in a SVG format. The different graphic icons may be placed on a background, such as in the shape of the geographic object (e.g., a rectangular shape of the road sign 304). The spacing, position, size, and/or layout of the graphic icons on the background may be based on the performed image segmentation. For example, the exact or substantially exact positioning of symbols and text may be accomplished using the bounded areas defined from the image segmentation.

Color of different symbols, background, text, and/or other features may also be determined and applied. For example, hue values (such as RGB pixel values) of the image representation of the geographic object may be determined. Known or future techniques to determine color or hue values from a raster image may be used. Then the determined values may be used to select colors from a color pallet or database. For example, the color pallet or database may include colors or shades thereof that are known to be associated with geographic objects, such a road signs. In one embodiment, the red color of a stop sign or a green color of expressway backgrounds are stored. The color may be applied to the graphic model in an automated process and/or a manual process.

Accordingly, a graphic model, such as the graphic model 461, of the desired geographic object, such as the road sign 304, may be constructed or generated. The graphic model may be associated or included with a navigation or map database, such as the database 132 (Step 736). For example, the map developer or employee or device thereof may store the graphic model in a road or path segment or node record that represents that real-world portion of the road, path, or area that includes the road sign or object. Accordingly, when data corresponding to the road segment record is accessed, such as by a navigation system or other device, the graphic model of the geographic object is accessed for navigation-related services, display, and/or other purposes. Alternatively, the graphic model may be stored separately from path/road segment or node records (e.g., an index may be used to associate or link the graphic model with appropriate nodes, segments, and/or other map data structures or layers). Also, the graphic model may be stored in a database separate from the navigation database 132.

The different steps, acts, or processes of the methods described herein may be mixed and matched. For example, the local dictionary constraint concept used for OCR may also be applied to retrieving template icons from the template database 156 or 425 as well as be applied to comparing reference components in the data library 164 or 512. In one embodiment, selected or limited template icons are provided or refreshed in the template database or local database based on a local or configurable area around a location associated with an identified image. Similarly, selected or limited reference components are provided or refreshed in the invariant reference component library or local library based on a local or configurable area around a location associated with an identified image. Template icons and reference components may be retrieved from the database 132, other databases, and/or other sources to generate or update the respective template database or data library for constrained processes.

Also, different or other methods, such as methods of manufacture or product-by-process methods, may be provided based on the description herein. Additionally, the methods mentioned herein may be implemented by a computer application, such as the graphic software application 152, that is executed by one or more processors, such as the processor 144.

ALTERNATIVES

As described above, terms, words, text, components and/or other features or data records within a selectable area are retrieved to generate or refresh a local dictionary or database used to constrain OCR or other template or reference matching. Alternatively, in addition to or instead of querying data within a proximity or area, certain data corresponding to path, road, or other connections are used to develop or generate the dictionary or database. For example, if real-world position associated with an image corresponds to a highway, then features, terms, and/or data connected to the highway may be retrieved regardless of proximity. In one embodiment, an image may be associated with a street or highway in the city of Chicago. Because of known street or map connections in the master database 132, the different streets, cities, other highways, and/or other geographic features connected to the specific street or highway of the image may be identified. Then, terms, words, and/or other data corresponding to different connected geographic features may be retrieved to generate the local database or dictionary. For example, the highway identified in the image may be a highway that connects to the city of Rockford, and so the term "Rockford" may be used in the dictionary as a possible term that might be on a sign in the image, even though the city or connected feature including the term is not close or proximate to the geographic location of the sign/highway or image thereof.

Furthermore, a type indication may also be used to develop or generate the local dictionary or database used to constrain OCR or other template or reference matching. For example, terms, words, features, and/or other data corresponding to a type of geographic object or feature may be retrieved. In one embodiment, position data of an image may be associated with a highway or expressway as opposed to a rural road or path or other area. Accordingly, words, text, and/or features associated with highways or expressways (such as text of an interstate shield symbol, a pattern of the interstate shield symbol, other associated data) may be queried and retrieved (as opposed to data corresponding to rural roads or other geographic types) to develop the dictionary or database.

Additionally, instead of constraining the OCR or other template or reference matching to the terms or data in the dictionary or database, the terms or data are prioritized within a list or group of data of the database. For example, different types of data or words/terms may be used for OCR or other matching processes, but certain terms or data may be prioritized for analysis based on the techniques above, such as terms or data within an area, terms or data corresponding to specific connections, and/or terms or data associated with specified types of features.

As mentioned above, the processing of the collected image data and/or other data may occur in a processing device at a map developer facility. Alternatively, some or all of the processing of the collected data may occur in the object collecting the data or components thereof, such as the vehicle or collection devices supporting the vehicle. Semi-processed or full processed data may then be sent to or transmitted to the map developer for further processing and/or storage in the map database.

Gradient vectors were described as invariant components to be matched to determine or identify geographic features, such as a road sign symbol or text thereof. Alternatively, other invariant components may be used to match or compare. For example, extrema points or associated region descriptors may be used. Gradient vectors are used because they provide a plurality of distinctive information, such as 128 elements, which makes it easier to compare, but other components or subcomponents may be used.

The embodiment described above focuses on generating a graphic model of a road sign. However, graphic models of other geographic features or objects may be generated. For example, graphic models of path or road markings, informational markings, markings within lanes, POIs, and/or other geographic objects or features may be constructed.

As described above, the generated graphic models may be used for navigation related functions or services. However, the generated graphic models may also be used for other applications. For example, the graphic models may be used for video games, virtual reality applications, computer graphics programs, city modeling and/or other map, geographic, or location based applications.

The collection of images described above focus on paths or roads of an area or region, such as a city or state. However, collection and processing of images taken along paths of an indoor structure or area may also be performed.

Furthermore, as described above, the collection of images occurs about or around roads or paths. In an alternate embodiment, images may be collected in any indoor or outdoor region or area, such as areas not associated with predetermined or fixed paths or roads. For example, images may be collected over different parts of an open area having no set paths.

The logic, software, or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

We claim:

1. A method of automatically constructing a graphic model of a road sign from an image to enhance a navigation database, the method comprising:
    receiving a plurality of images of regions about roads;
    identifying an image of the plurality of images that includes a road sign;
    performing a scale-invariant feature transform on the road sign in the image;
    generating a graphic model of the road sign based on results of the scale-invariant feature transform, wherein generating the graphic model includes:
        matching scale-invariant components determined from performing the scale-invariant feature transform with reference scale-invariant components in a data library;
        identifying a road sign symbol of the road sign in the image based on the matching; and
        retrieving a graphic road sign symbol icon from a template database based on identifying the road sign symbol;
    generating a local dictionary by retrieving text data of geographic features within a configurable area around a location associated with the identified image, the text data of the geographic features retrieved from the navigation database; and
    associating the graphic model of the road sign with the navigation database.

2. The method of claim 1, wherein the road sign in the image comprises a traffic guide sign.

3. The method of claim 1, wherein the road sign in the image comprises an expressway sign.

4. The method of claim 1, wherein the plurality of images comprise raster images.

5. The method of claim 1, wherein the graphic model of the road sign is in a scalable vector graphics format.

6. The method of claim 1, further comprising:
    performing optical character recognition on the road sign in the image based on the generated local dictionary.

7. The method of claim 6, wherein generating the graphic model is also based on results of the optical character recognition.

8. The method of claim 6, wherein the configurable area is configured based on selecting a radius about the location.

9. The method of claim 8, wherein the location comprises a latitude coordinate and a longitude coordinate.

10. The method of claim 1, further comprising:
    prior to performing the scale-invariant feature transform, performing image segmentation on the road sign in the image.

11. The method of claim 10, wherein generating the graphic model includes laying out the graphic road sign symbol icon as a function of the image segmentation.

12. The method of claim 1, further comprising:
detecting an arrow of the road sign in the image based on binary matching.

13. A computer-readable medium configured to store a computer program that performs a method of sign reconstruction from a path image, the method comprising:
receiving a plurality of images of paths;
identifying an image of the plurality of images that includes a path sign;
selecting an image representation of the path sign from the identified image;
performing image segmentation on the image representation of the path sign, the image segmentation including identifying different regions of the path sign;
generating a dictionary by retrieving words associated with geographic features from a configurable area around a location associated with the identified image;
performing optical character recognition on at least one of the different regions in the image representation of the path sign as a function of the dictionary to identify text of the path sign;
performing a scale-invariant feature transform on at least one of the different regions in the image representation of the path sign to identify a path sign feature;
generating a graphic model of the path sign based on the image segmentation, the identified text of the path sign, and the identified path sign feature; and
associating the graphic model with the master navigation database.

14. The method of claim 13, wherein generating the graphic model comprises retrieving graphic template characters corresponding to the identified text.

15. The method of claim 13, wherein generating the graphic model comprises retrieving a graphic template symbol corresponding to the identified path sign feature.

16. The method of claim 13, wherein associating the graphic model with the master navigation database includes storing the graphic model as a geographic data attribute in a road segment data record.

17. The method of claim 13, wherein associating the graphic model with the master navigation database includes linking or indexing the graphic model with a road segment data record.

18. A method for constructing a graphic model of a geographic object from an image, the method comprising:
receiving an image from a plurality of collected images of geographic areas, the image including a desired geographic object;
determining scale-invariant components of the desired geographic object in the image;
matching the determined scale-invariant components with reference scale-invariant components in a map data library;
identifying a symbol of the desired geographic object in the image based on the matching;
generating a graphic model of the desired geographic object based on the identified symbol and based on a roadway associated with the desired geographic object.

19. The method of claim 18, wherein generating the graphic model comprises selecting a symbol icon based on the identified symbol.

20. The method of claim 18, wherein the identified symbol comprises a shield symbol of a road sign.

21. The method of claim 18, wherein the map data library comprises a local library generated based on a location associated with the image.

22. A graphic model of a path object displayed on a navigation user interface, the graphic model generated from a method of reconstructing a geographic object from an image, the method comprising:
receiving a plurality of images corresponding to paths;
identifying an image of the plurality of images that includes a path object;
determining scale-invariant features of the path object in the image to identify a symbol of the path object; and
generating a graphic model of the path object based on the identified symbol of the path object in the image, wherein generating the graphic model includes retrieving a graphical icon from a template database based on the identified symbol, wherein the graphic model includes an image representation of at least one path and the path object.

23. The method of claim 22, wherein the determined scale-invariant features comprise gradient vectors.

24. The method of claim 22, wherein the graphic model includes the image representation of the at least one path and the path object.

25. The method of claim 1, wherein the graphic model includes the graphic road sign symbol icon positioned next to an image representation of a roadway.

26. The method of claim 1, further comprising:
receiving the location associated with the identified image, wherein the location is determined via a positioning system.

* * * * *